Aug. 1, 1944.   A. W. KLOMP   2,354,816
FIXTURE FOR GEARS
Filed July 12, 1943   2 Sheets-Sheet 1

INVENTOR.
Alfred W. Klomp
BY
his Attorney

Aug. 1, 1944. A. W. KLOMP 2,354,816
FIXTURE FOR GEARS
Filed July 12, 1943 2 Sheets-Sheet 2

INVENTOR.
Alfred W. Klomp
BY
his Attorney

Patented Aug. 1, 1944

2,354,816

UNITED STATES PATENT OFFICE 2,354,816

FIXTURE FOR GEARS

Alfred W. Klomp, Detroit, Mich., assignor, by mesne assignments, to Mahlon M. Matchett, Detroit, Mich.

Application July 12, 1943, Serial No. 494,410

12 Claims. (Cl. 279—8)

This invention relates to improvements in fixtures for gears, and refers particularly to fixtures for bevel, spiral bevel, skew bevel and hypoid gears. The teeth of most commercially processed bevel gears are not necessarily accurate from a theoretical standpoint particularly after they have been heat treated. In most cases any one, or a combination of two or more, of the following errors occur to a greater or less extent. The spacing of the teeth is improper; the teeth are non-radial to their common vertex; and the pitch cone angle of the teeth is inaccurate.

While there are a number of fixtures now on the market for gripping bevel gears by their teeth while finishing operations, such as boring, turning, or facing, are being performed, all of them assume that the teeth of the gears to be held are theoretically perfect, and no provision is made to compensate for or offset any inaccuracies which may exist in order to obtain concentricity of the gear when so held; and pitch circle concentricity is the one essential condition that must exist before finishing operations are commenced. Consequently when such fixtures are employed if any of the three above-mentioned errors are at all pronounced the gears are eccentrically held during finishing operations after which it is too late to remedy the resultant defects and the gears are scrap.

It is an object of this invention to provide a fixture for holding bevel gears wherein parts are movable so that when a gear is engaged thereby it is so held that concentricity of any pitch circle arbitrarily taken around the gear at any intermediate location between its major and minor diameters is assured.

Another object of the invention is to provide such a fixture including a plurality of separate, spaced tooth engaging members each of which forms a bearing for the opposite longitudinal sides of one individual tooth of the gear to be held, and means for retaining each tooth so engaged in contact with its tooth engaging member.

A further object of the invention is to provide such a fixture wherein each tooth engaging member is separately rotatable about an axis parallel to the axis of the fixture, and all the first named axes are equidistant from the fixture axis; wherein each tooth engaging member is mounted for movement at right angles to a line extending radially from the axis of the fixture; and wherein each tooth engaging member is rotatable about an axis extending through the pitch line of the tooth to be engaged thereby substantially centrally of the length of the tooth. Again the last named axis must also intersect the axis, when produced, which extends parallel to that of the fixture, and must be disposed at right angles thereto.

Thus in the case of gears the teeth of which are non-radial to their common vertex adjustment of the fixture is made automatically by rotation of each tooth engaging member about its axis parallel to the axis of the fixture when a tooth of the gear to be held thereby is pressed into engagement with each tooth engaging member; in the case of gears the teeth of which are improperly spaced adjustment is again automatically made as a tooth of the gear is pressed into engagement with each tooth engaging member by movement of the said members at right angles to radial lines extending from the axis of the fixture; and in the case of gears the pitch-cone angle of which is inaccurate adjustment is again automatically made as a tooth of the gear is pressed into engagement with each tooth engaging member about axes which intersect the pitch lines of the gear teeth engaged thereby.

Another object of the invention is to provide a fixture for gears including means for quickly and easily checking the concentricity of the gear in the fixture.

Having thus broadly stated some of the objects and advantages of the invention I will now proceed to describe a preferred embodiment thereof with the aid of the accompanying drawings, in which.

Figure 1:
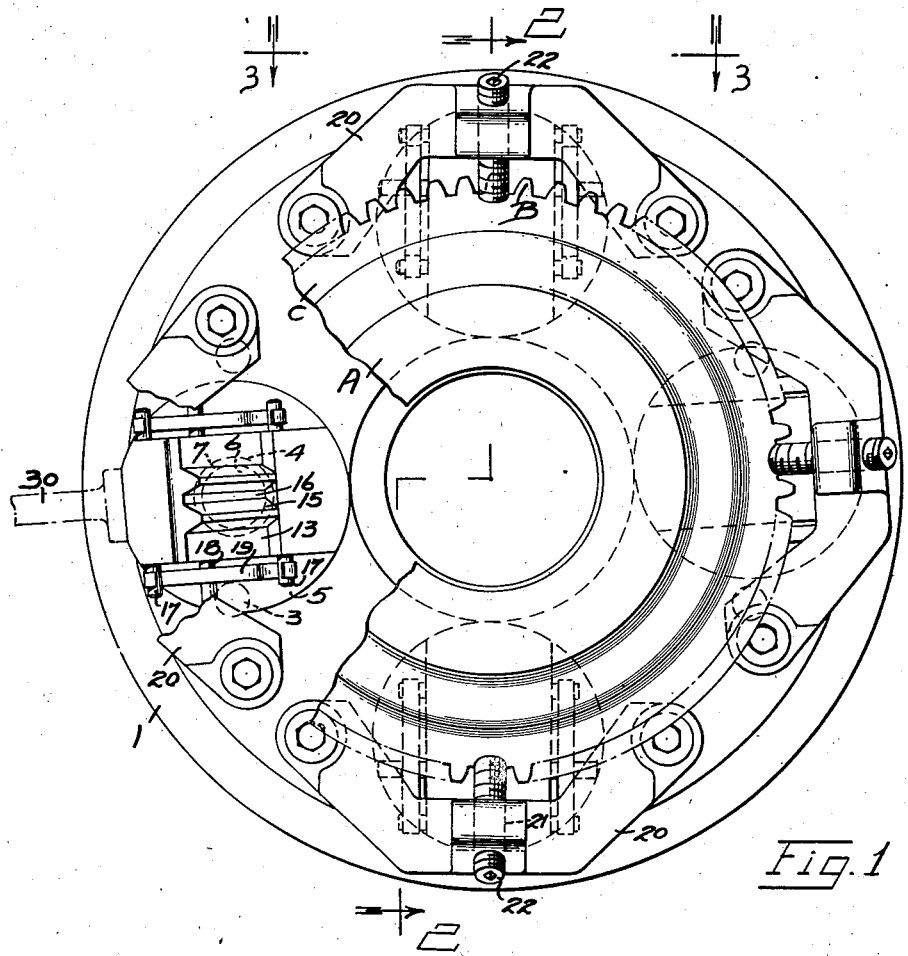
Figure 1 illustrates a front view of the fixture showing a portion of a bevel gear supported thereby.
Figure 3:
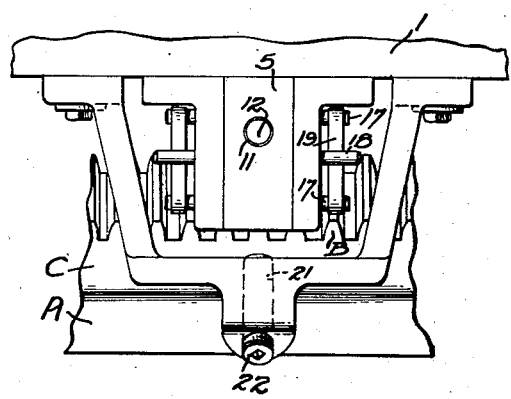
Figure 3 is a partial view on the line 3—3 of Figure 1.

Referring to the drawings, 1 designates the body of the fixture which is usually annular and is suitably mounted for rotation. In the present instance the body is secured to a faceplate 2 by screws 3. Formed through the body 1 are a plurality of openings 4 the axes of which are equidistant from and parallel to the axis of the body 1, and mounted upon the latter are a plurality of guides 5. Since all the guides and their mountings are identical I will now describe one of them.

Mounted in one of the openings 4 is a bushing 7 and projecting rearwardly from one of the guides 5, the rear of which rests against the front of the body 1, is a spindle 6 which extends through the said bushing. The spindle is axially bored and tapped from its rear extremity to receive a screw 8 by which a washer 9 is held against its rear face which projects very slightly behind the said bushing. Thus the guide 5 and spindle 6 may be relatively freely turned about the axis of the opening 4.

The front of the guide 5 is forwardly and outwardly inclined and has a transverse arcuate seat 10 formed therein the axis of which extends at right angles to and is intersected by the axis of the spindle 6 when the latter is forwardly produced. Formed through the guide 5 from its outer periphery is an opening 11 having an indicating pin 12 therein which is radial to the body axis and is axially movable. 13 denotes a tooth engaging member the rear face 14 of which is arcuate and rests in the seat 10 to rock about the axis of the latter, and provided upon the front face of the member 13 which is forwardly and outwardly inclined are two substantially parallel projections 15 having a tooth receiving groove 16 between them. The lower extremity of the opening 11 extends into the seat 10 and formed in the front face of the indicating pin 12 is a transverse recess 23 which houses a portion of a rod 24 the opposite side of which extends into a longitudinal groove 25 formed in the rear arcuate face 14 of the member 13. Consequently as the latter is rocked on its seat 10 and the projections 15 are moved angularly relative to the axis of the body 1 the pin 12 is moved inwardly or outwardly.

Extending outwardly from opposite sides of the guide 5 and usually passing completely through the latter are retaining rods 17 one of which is positioned toward the front outer extremity of the guide and the other is located toward the inner rear extremity of the latter. Projecting also from opposite side of the tooth engaging member 13 and usually extending through the latter is a supporting rod 18. Mounted on opposite extremities of the two retaining rods 17 are resilient bars 19 which, intermediately of their length, bear against the front of the projecting extremities of the supporting bar 18 and hold the arcuate rear face 14 of the member 13 upon its seat 10. Moreover the length of the rods 17 and 18 and the lateral spacing of the resilient bars 19 from the adjacent ends of the member 13 must be sufficient to permit adjustment of the latter lengthwise in either direction along the seat 10.

Mounted on the body 1 on each side of the guide 5 is one extremity of a forwardly and outwardly projecting yoke 20 the central portion of which is forwardly and outwardly spaced relative to the tooth engaging member 13 and has a tapped hole 21 therethrough the axis of which, if produced, would extend substantially parallel to and in front of the outer edges of the projections 15. A set screw 22 is in threaded engagement with this hole 21.

It will of course be understood that there are not only a plurality of guides 5 but that each guide is similarly provided with a tooth engaging member constructed and arranged as hereinbefore set forth.

When a gear A is placed upon the fixture a single tooth B is inserted into the groove 16 formed between the two projections 15 on each member 13 so that the adjacent faces of each pair of projections support opposite sides of an individual tooth. As the gear is pressed against the fixture by tightening the set screws 22 against the back cone face C of the gear the members 13 automatically adjust themselves to compensate for any of the three usual forms of error above mentioned so that the gear axis may be concentric with that of the fixture and any pitch circle of the gear coaxial with the fixture. If the teeth of the gear are improperly spaced the members 13 automatically move lengthwise in their seats and at the same time the guides 5 may also turn about the axes of the spindles 6; if the teeth are non-radial to their common vertex the guides 5 turn about the axes of the spindles 6; and if the pitch-cone angle of the gear is incorrect the members 13 turn on their arcuate seats 10. All these movements, or any combination of them, occur automatically during tightening of the set screws 22. Then, provided the latter are relatively correctly tightened, the gear must be concentric with the fixture.

It may, however, easily happen that one set screw 22 is tightened too much and the opposite one not enough so that the gear is still eccentric. To check this the locating pins 12 are provided which are so arranged that their outer faces are normally flush with the periphery of their respective guides 5. If one pin is located say ten-thousandths within its guide periphery and the opposite pin projects an equal amount then proper adjustment of the set screws must be made so that their locating pins are both flush with their respective guide peripheries. To facilitate this setting and check the pin positions a height gauge of conventional design as indicated at 30 may be provided on each guide 5, having an operating arm 31 in contact with the outer face of the pin and also connected in the usual manner with a pointer 32. In this way readings may be quickly and accurately taken to insure the correct relative tightening of all the set screws 22.

Figure 2:
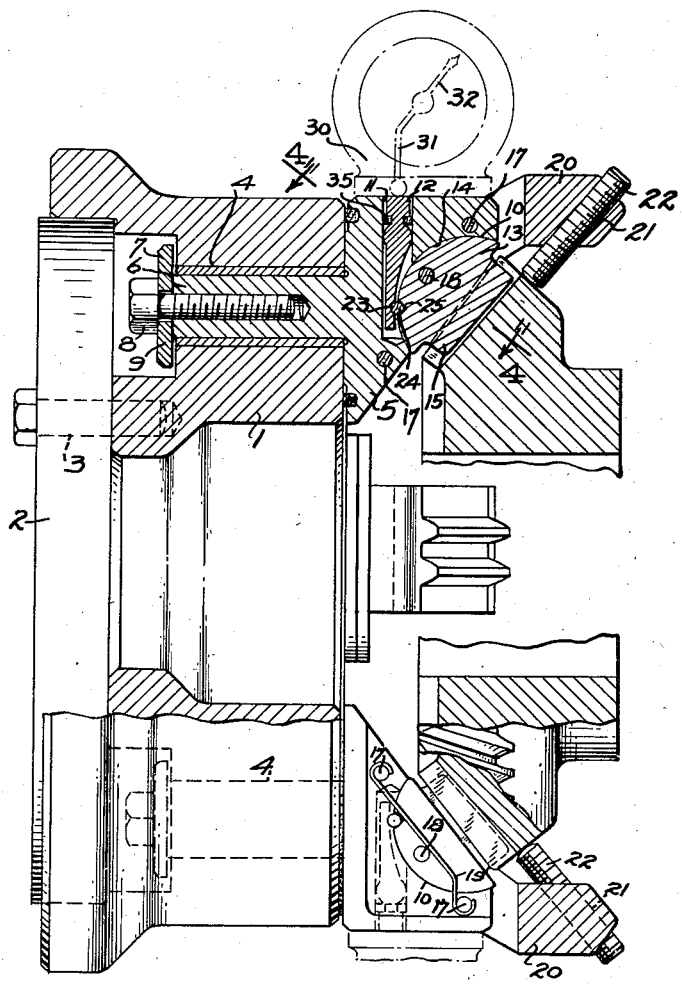
Figure 2 is a section on the line 2—2 of Figure 1.
Figure 4:
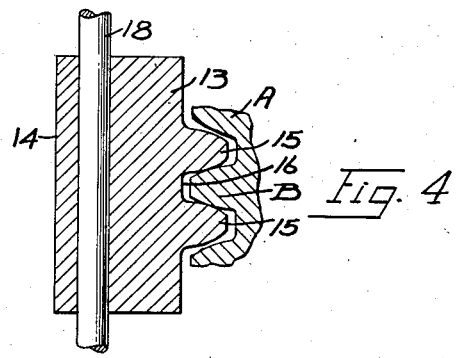
Figure 4 is a section on the line 4—4 of Figure 2 showing a portion of the gear and one tooth engaging member.

If the gears to be supported in a fixture have a number of teeth which is divisible by four the guides 5 are placed at 90 degrees to one another upon the body. If the number of teeth is divisible by two but not by four the guides are arranged in diametrically opposed pairs but with one pair not exactly at 90 degrees to the other, as shown in Figure 2. If the gears have an odd number of teeth the guides are arranged as nearly as possible in opposed pairs to function as described. It must also be noted that the axes of the arcuate seats 10 extend through the pitch lines of the teeth to be engaged substantially centrally of the length of the teeth.

35 denotes a resilient gasket which may be employed to retain each indicating pin 12 in its proper position to engage one side of the rod 24; however, if preferred, other means may be employed for accomplishing this purpose.

While in the foregoing the preferred embodiments of the invention has been described and shown it is understood that alterations and modifications may be made thereto provided they fall within the scope of the appended claims.

What I claim is:

1. A fixture for bevel gears including a body, a plurality of tooth engaging members thereon each having means thereon for supporting a tooth of a gear, means for retaining the supported gear teeth in engagement with said members, each member being mounted for rotation about two axes angularly disposed to one another.

2. A fixture for bevel gears including a body, a plurality of tooth engaging members adapted to support teeth of a gear, means carried by said body for retaining the supported teeth in engagement with said members, each member being mounted upon the body for rotation about an axis parallel to the body axis and also about a second axis which intersects the first named axis when produced.

3. A fixture for gears including a body mounted for rotation, a plurality of tooth engaging members mounted thereon for independent movement, means on said members inclined to the body axis for supporting teeth of a gear, means for retaining the gear teeth in engagement with said teeth supporting means, the movement of said members varying the inclination of said supporting means relative to the body axis, axially movable indicating pins mounted radially relative to the body axis, and means associated with each pin and member for moving the former upon movement of the latter.

4. A fixture for bevel gears including a body, a plurality of tooth engaging members mounted thereon having means for supporting teeth of a bevel gear for a substantial distance therealong, means for retaining the supported gear teeth in engagement with said supporting means, and each member being mounted for rotation about an axis extending transversely to the axis of the body to properly support teeth of different pitch cone angles.

5. A fixture for bevel gears including a body, a plurality of tooth engaging members on said body each having projections thereon for contacting and supporting opposite sides of any one tooth of a bevel gear for a substantial distance therealong and across, and means for retaining the supported gear teeth in engagement with said projections, each member being mounted for rotation about two axes which intersect one another on the pitch cone angle of the gear.

6. A fixture for bevel gears including a body, a plurality of spaced tooth engaging members mounted for rotation thereon, projections on each member to contact and support opposite sides of any one tooth of a bevel gear for a substantial distance therealong, the axes of rotation of said members extending between their projections whereby the members are free to adjust themselves to contact and support teeth non-radial to their common axis, and means for forcing the gear teeth into contact with said projections whereby said members are moved to their adjusted positions.

7. A fixture for bevel gears including a body, a plurality of tooth engaging members mounted thereon for both rotary and linear movement, each member having projections thereon with a tooth receiving groove formed between them, said projections being adapted to contact and support opposite sides of any one tooth of a bevel gear for a substantial distance therealong, the axis of rotation of each member extending through one tooth receiving groove between the projections and each member being slidable substantially tangentially to the pitch diameter of the gear supported thereby whereby said members may be adjusted both rotarily and linearly to properly seat teeth which are improperly spaced, and means for exerting pressure against said gears and moving said members thereby to their adjusted positions.

8. A fixture for bevel gears including a body, a plurality of tooth engaging members mounted thereon for rotary movement about two axes, projections of substantial length having a tooth receiving groove formed between them on each member to contact and support opposite sides of any one tooth of a bevel gear, one axis of rotation of each member extending through said groove centrally between the projections and each member being also rotatable about a second axis extending at right angles to the first named axis whereby said members may be adjusted to afford proper seats on said projections for gear teeth which are both non-radial to their common vertex and of incorrect pitch cone angle, and means for forcing the gear teeth into contact with said projections whereby said members are moved to their adjusted positions.

9. A fixture for bevel gears including a body, a plurality of tooth engaging members mounted thereon for both rotary and linear movement, each member having two spaced projections of substantial length thereon spaced by a tooth receiving groove to contact and support opposite sides of any one tooth of a bevel gear, each member being mounted for movement substantially tangentially to the pitch diameter of the gear it supports and also being rotatable about an axis parallel with its path of movement whereby improperly spaced teeth of different pitch cone angles may be properly seated against said projections by self-adjustment of said members, and means for forcing the gear teeth into contact with said projections whereby said members are self-adjusted to properly seat the supported gear teeth.

10. A fixture for bevel gears including a body, a plurality of tooth engaging members having means thereon for suporting teeth of a bevel gear, a yoke extending forwardly and outwardly from the tooth opposite each member, a screw in threaded engagement with each yoke extending through the latter substantially in the plane of the pitch cone angle of the gear to bear against a surface on the latter whereby said gear may be moved by said screws to centralize it upon said body and the supported gear teeth held in firm engagement with said projections.

11. A fixture for gears including a body, a plurality of tooth engaging members mounted thereon for rotary movement, means on said members for supporting teeth of a bevel bear, means for holding the supported gear teeth in engagement with the supporting means, an indicating means on the body associated with each member for registering the comparative inclination of each tooth engaging member with respect to the axis of the gear, and means coacting with each member and the indicating means associated therewith whereby rotary movement of the member actuates the indicating means.

12. A fixture for bevel gears including a body, a plurality of tooth engaging members mounted thereon each having projections thereon for contacting and supporting opposite sides of any one tooth of a bevel gear for a substantial distance therealong, each member being mounted for rotation about an axis extending transversely to the body axis, means extending substantially in the plane of the pitch cone angle of the gear for holding the supported gear teeth in engagement with said projections, indicating means for registering the comparative inclination of each tooth engaging member with respect to the axis of the gear teeth mounted on the body, and means cooperating with each member and one indicating means whereby rotary movement of the former actuates the latter.

ALFRED W. KLOMP.